US012604340B2

(12) United States Patent
Thanayankizil et al.

(10) Patent No.: US 12,604,340 B2
(45) Date of Patent: Apr. 14, 2026

(54) SYSTEMS AND METHODS FOR OPTIMIZING CHANNELS USING WI-FI 7

(71) Applicant: GM Global Technology Operations LLC, Detroit, MI (US)

(72) Inventors: Lakshmi V. Thanayankizil, Troy, MI (US); Scott Thomas Droste, West Bloomfield, MI (US); Baljeet Singh Gill, Stouffville (CA)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 18/486,217

(22) Filed: Oct. 13, 2023

(65) Prior Publication Data

US 2025/0126640 A1      Apr. 17, 2025

(51) Int. Cl.
H04W 74/08        (2024.01)
H04W 84/12        (2009.01)

(52) U.S. Cl.
CPC ............ H04W 74/08 (2013.01); H04W 84/12 (2013.01)

(58) Field of Classification Search
CPC .. H04W 74/08; H04W 84/12; H04W 74/0808
See application file for complete search history.

(56) References Cited

U.S. PATENT DOCUMENTS

| 6,934,876 B1 * | 8/2005 | Holeman, Sr. ...... H04L 61/5038 |
| | | 714/4.12 |
| 12,127,249 B2 * | 10/2024 | Li ..................... H04W 74/0808 |

| 12,227,160 B2 * | 2/2025 | Hooli .................... B62D 11/003 |
| 2009/0059794 A1 * | 3/2009 | Frei ..................... H04W 72/541 |
| | | 370/235 |
| 2014/0119291 A1 * | 5/2014 | Lee ........................ H04W 24/00 |
| | | 370/329 |
| 2017/0311206 A1 * | 10/2017 | Ryoo .................... H04W 24/02 |
| 2017/0315223 A1 * | 11/2017 | Heldmaier .............. G01S 13/46 |
| 2018/0103458 A1 * | 4/2018 | Tooher .................. H04W 16/14 |
| 2018/0375729 A1 * | 12/2018 | Tzoreff .............. H04L 41/0803 |
| 2022/0124588 A1 * | 4/2022 | Zhu ........................ H04W 84/12 |
| 2022/0183064 A1 * | 6/2022 | Talarico ........... H04W 74/0808 |
| 2023/0072968 A1 * | 3/2023 | Bahadori ................ G01S 5/011 |
| 2023/0076697 A1 * | 3/2023 | Silverman ............. H04W 76/15 |

(Continued)

OTHER PUBLICATIONS

WO_2019224480_A2 (Year: 2019).*
WO_2024022385_A1 (Year: 2023).*

*Primary Examiner* — Nizar N Sivji
(74) *Attorney, Agent, or Firm* — Honigman LLP; Matthew H. Szalach; Jonathan P. O'Brien

(57)                    ABSTRACT

A computer-implemented method that when executed on data processing hardware causes the data processing hardware to perform operations including setting an initial transmission channel for a transmission radio between a station and an access point, setting an initial listen channel for a listen radio between the station and the access point, obtaining cleanliness data and free channel data, performing one of maintaining the initial transmission channel and the initial listen channel or switching transmission from the transmission radio to the listen radio based on the cleanliness data, and performing one of maintaining the initial transmission channel and the initial listen channel or changing the initial transmission channel to a different channel based on the free channel data.

20 Claims, 3 Drawing Sheets

(56) References Cited

U.S. PATENT DOCUMENTS

| | | | |
|---|---|---|---|
| 2023/0129493 A1* | 4/2023 | Kiilerich Pratas .... | H04W 24/08 370/235 |
| 2023/0284270 A1* | 9/2023 | Fu ..................... | H04W 74/0808 370/329 |
| 2023/0422070 A1* | 12/2023 | Feng ................... | H04B 7/0626 |
| 2024/0306203 A1* | 9/2024 | Ljung .............. | H04W 74/0816 |
| 2024/0373483 A1* | 11/2024 | Chang .............. | H04W 74/0816 |

\* cited by examiner

SYSTEMS AND METHODS FOR OPTIMIZING CHANNELS USING WI-FI 7

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to systems and methods for optimizing channels using Wi-Fi 7 (IEEE 802.11be). Specifically, current Wi-Fi access points (APs) or hotspots operate by choosing a channel with a set frequency band at which to operate. The APs choose the frequency channel within the band when turned on, and the chosen frequency channel stays the same through the duration of the connection. All devices (stations (STAs)) that connect to the AP, will scan and find the AP in the chosen channel within the frequency band, and join the AP at the chosen frequency channel. After that, all the communication will be only on the chosen frequency channel to which the AP is set. If the channel gets congested, radios either have to wait for their turn (which may increase latency) or move to a different channel (which may increase latency and may also cause session teardown).

Accordingly, there is room for improvement in the Quality of Experience (QoE) for Wi-Fi connection between a STA and AP using Wi-Fi 7.

SUMMARY

One aspect of the disclosure provides a system for a vehicle comprising a Wi-Fi station, data processing hardware, and memory hardware in communication with the data processing hardware, the memory hardware storing instructions that when executed on the data processing hardware cause the data processing hardware to perform operations comprising setting an initial transmission channel for a transmission radio, setting an initial listen channel for a listen radio, obtaining a channel state report based on data related to the transmission radio and the listen radio, determining cleanliness data based on the channel state report indicating a cleanliness of the transmission radio and a cleanliness of the listen radio, if the cleanliness data indicates the transmission radio is cleaner than the listen radio, maintaining the initial transmission channel and the initial listen channel, and if the cleanliness data indicates the listen radio is cleaner than the transmission radio, switching transmission from the transmission radio to the listen radio.

Implementations of the disclosure may include one or more of the following optional features. In some implementations, the operations further comprise obtaining free channel data indicating a percentage of times each of the transmission radio and the listen radio detect a free channel. The operations may further comprise determining whether aggregate channel free times are similar between the transmission radio and the listen radio based on the free channel data. The operations may further comprise if the aggregate channel free times are similar between the transmission radio and the listen radio, maintaining the initial transmission channel and the initial listen channel. The operations may further comprise if the aggregate channel free times are dissimilar between the transmission radio and the listen radio, changing the initial transmission channel to a different channel. The operations may further comprise if the aggregate channel free times are dissimilar between the transmission radio and the listen radio, changing the initial radio channel to a different channel.

The Wi-Fi station may use Wi-Fi 7.

Another aspect of the disclosure provides a computer-implemented method that when executed on data processing hardware causes the data processing hardware to perform operations comprising setting an initial transmission channel for a transmission radio between a station and an access point, setting an initial listen channel for a listen radio between the station and the access point, obtaining a channel state report based on data related to the transmission radio and the listen radio, and determining cleanliness data and free channel data based on the channel state report. If the cleanliness data indicates the transmission radio is cleaner than the listen radio, maintaining the initial transmission channel and the initial listen channel. If the cleanliness data indicates the listen radio is cleaner than the transmission radio, switching transmission from the transmission radio to the listen radio. If the free channel data indicates aggregate channel free times are similar between the transmission radio and the listen radio, maintaining the initial transmission channel and the initial listen channel. Finally, if the free channel data indicates the aggregate channel free times are dissimilar between the transmission radio and the listen radio, changing the initial transmission channel to a different channel.

Implementations of the disclosure may include one or more of the following optional features. In some implementations, the cleanliness data indicates a cleanliness of the transmission radio and a cleanliness of the listen radio.

The free channel data may indicate a percentage of times each of the transmission radio and the listen radio detect a free channel.

If the aggregate channel free times are dissimilar between the transmission radio and the listen radio, the method may include changing the initial radio channel to a different channel.

The station may be one of a smartphone, a tablet, or a laptop computer.

The access point may be in a vehicle.

The method may be implemented using Wi-Fi 7.

Another aspect of the disclosure provides a computer-implemented method that when executed on data processing hardware causes the data processing hardware to perform operations comprising setting an initial transmission channel for a transmission radio between a station and an access point, setting an initial listen channel for a listen radio between the station and the access point, obtaining cleanliness data and free channel data, performing one of maintaining the initial transmission channel and the initial listen channel or switching transmission from the transmission radio to the listen radio based on the cleanliness data, and performing one of maintaining the initial transmission channel and the initial listen channel or changing the initial transmission channel to a different channel based on the free channel data.

Implementations of the disclosure may include one or more of the following optional features. In some implementations, the operations comprise maintaining the initial transmission channel and the initial listen channel when the cleanliness data indicates the transmission radio is cleaner than the listen radio and when the free channel data indicates aggregate channel free times are similar between the transmission radio and the listen radio.

The operations may comprise switching transmission from the transmission radio to the listen radio when the cleanliness data indicates the listen radio is cleaner than the transmission radio.

The operations may comprise changing the initial transmission channel to a different channel when the free channel data indicates aggregate channel free times are dissimilar between the transmission radio and the listen radio.

The station may be one of a smartphone, a tablet, or a laptop computer and the access point is in a vehicle.

The method may be implemented using Wi-Fi 7.

The details of one or more implementations of the disclosure are set forth in the accompanying drawings and description below: Other aspects, features, and advantages will be apparent from the description, drawings, and claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
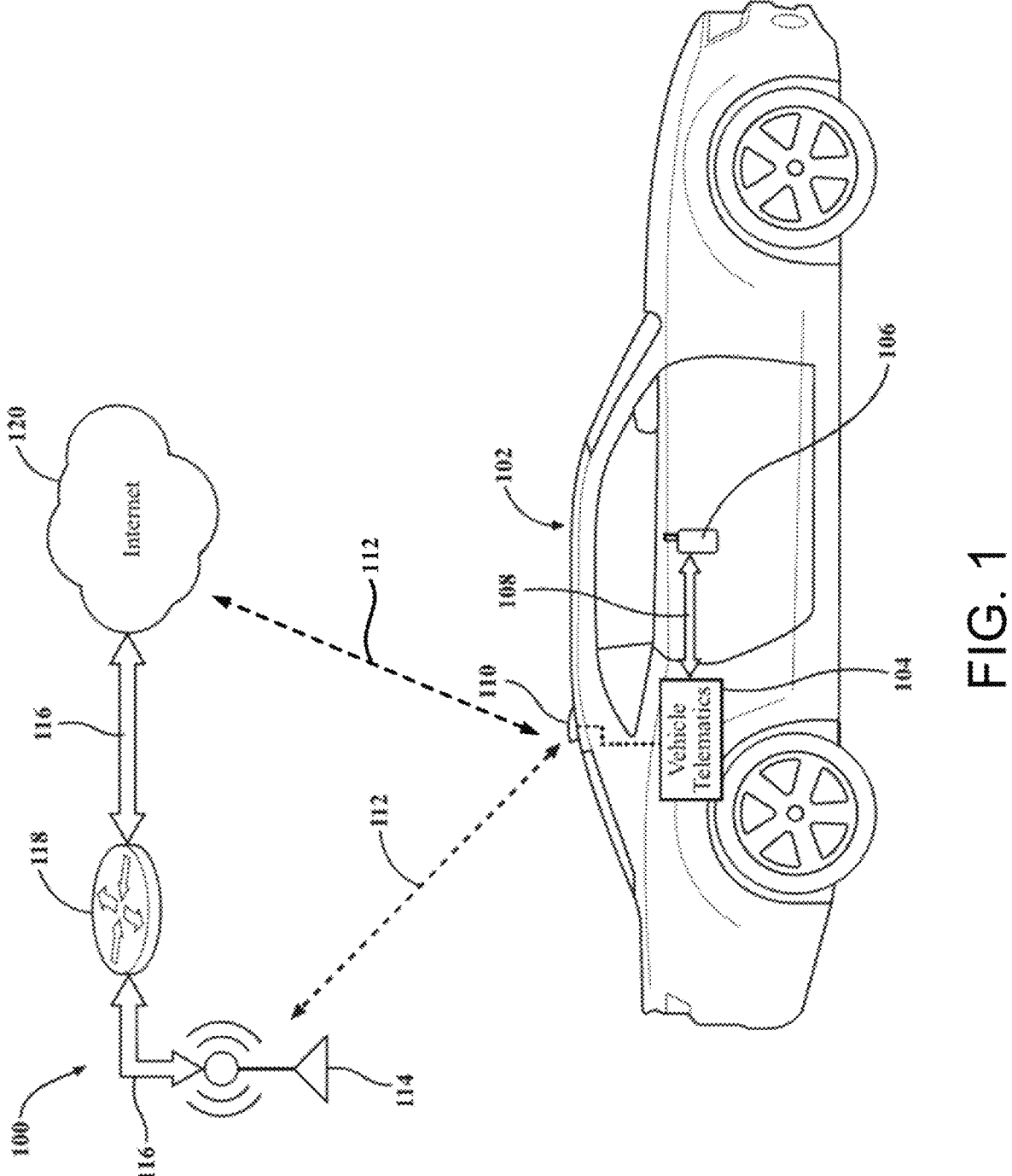
FIG. 1 is a schematic of an exemplary system for Wi-Fi channel optimization, in accordance with the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises." "comprising." "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second." "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Referring to FIG. 1, a Wi-Fi system 100 is generally shown. The Wi-Fi system 100 includes a vehicle 102, which may be an automobile. As will be appreciated, the vehicle may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain configurations. The vehicle may also comprise a truck, a watercraft, an aircraft, and/or one or more other types of vehicles. In addition, it will also be appreciated that the vehicle may comprise any number of other types of mobile platforms with a system such as the Wi-Fi system 100.

The Wi-Fi system 100 includes a controller comprising a computer system 104, which may also be referred to as a telematics system. The computer system 104 of the controller includes a processor and a memory. The processor performs the computation and control functions of the controller and may comprise any type of processor or multiple processors, single integrated circuits such as a microprocessor, or any suitable number of integrated circuit devices and/or circuit boards working in cooperation to accomplish the functions of a processing unit. During operation, the processor executes one or more programs contained within the memory and, as such, controls the general operation of the controller and the computer system of the controller, generally, in executing the processes described herein, such as the method 200 discussed further below in connection with FIG. 3.

The memory may be any type of suitable memory. For example, the memory may include various types of dynamic random access memory (DRAM) such as SDRAM, the various types of static RAM (SRAM), and the various types of non-volatile memory (PROM, EPROM, and flash). In certain examples, the memory may be located on and/or co-located on the same computer chip as the processor.

The telematics system 104 may be in communication with a Wi-Fi Station (STA) 106. The STA 106 may be any suitable device that can access Wi-Fi connections and allows transmission and reception of data. In some examples, the STA 106 may be an external device such as a smartphone, a tablet (e.g., an iPad®), a laptop computer, etc. In other examples, the STA 106 may be a component of the vehicle 102, such as a computer system. The telematics system 104 may be in communication with the STA 106 via a first connection 108, which may be a Wi-Fi 7 (IEEE 802.11be) communication or any other suitable communication. The vehicle 102 may include an antenna 110 in communication with the telematics system 104. The antenna 110 may be configured to transmit and receive data, including connecting the telematics system 104 to the Internet 120 via a second connection 112, which is a wireless connection. In some examples, the telematics system 104 may be connected to the Internet 120 via a satellite link.

The telematics system 104 may operate as an access point (AP) to the STA 106. That is, the STA 106 may connect to the telematics system 104 via Wi-Fi 7 (or any other suitable connection) to connect to the Internet 120.

In some examples, the Wi-Fi system 100 may include an external access point (AP) 114 that is in communication with the telematics system 104 via the second connection 112. The external AP 114 is in communication with a router 118 via a third connection 116, which may be a wired or wireless connection. The router 118 may be co-located with the external AP 114. In some examples, the external AP 114 may be connected to the Internet 120 via a satellite link. The router 118 is in communication with the Internet 120.

The external AP 114 may be disposed in any suitable location, such as restaurants, coffee shops, gas stations, traffic lights, Electric Vehicle (EV) charging stations, etc. In some examples, the external AP 114 is accessible by the public and available to new connections. The external AP 114 may offer free or metered internet access to stations connecting to them.

Figure 2:
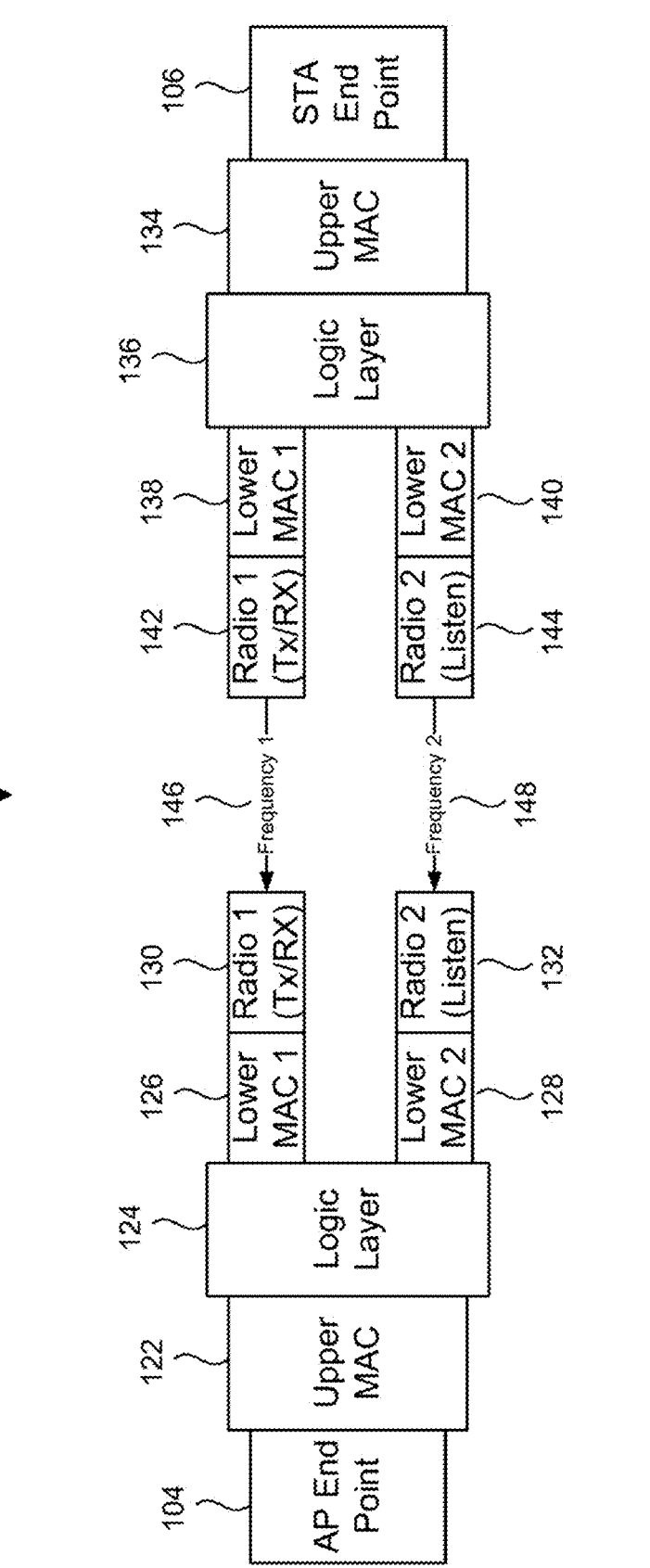
FIG. 2 is a schematic of an exemplary connection architecture for the system for Wi-Fi channel optimization of FIG. 1.

Referring to FIG. 2, which illustrates a schematic representation of an exemplary connection architecture of the Wi-Fi system 100, the telematics system 104 (operating as an AP) includes an upper media access control (MAC) 122 and a logic layer 124 or processor. The telematics system 104 includes a first lower MAC 126 for a first transmission (Tx/RX) radio 130 and includes a second lower MAC 128 for a second listen radio 132. The STA 106 includes an upper MAC 134 and a logic layer 136 or processor. The STA 106 includes a first lower MAC 138 for a first transmission (Tx/RX) radio 142 and includes a second lower MAC 140 for a second listen radio 144. The first transmission radios 130, 142 may connect and communicate across a first frequency 146 (e.g., 2.4 GHZ, 5 GHZ, or 6 GHZ). The second listen radios 132, 144 may connect and communicate across a second frequency 148 (e.g., 2.4 GHZ, 5 GHZ, or 6 GHz). While first radios 130, 142 and second radios 132, 144 are shown and described, it should be understood that any suitable number of radios may be included in the Wi-Fi system 100, including additional radios. Within each radio, there may be a plurality of wireless local area network (WLAN) channels that the Wi-Fi system 100 may choose for its connection.

Figure 3:
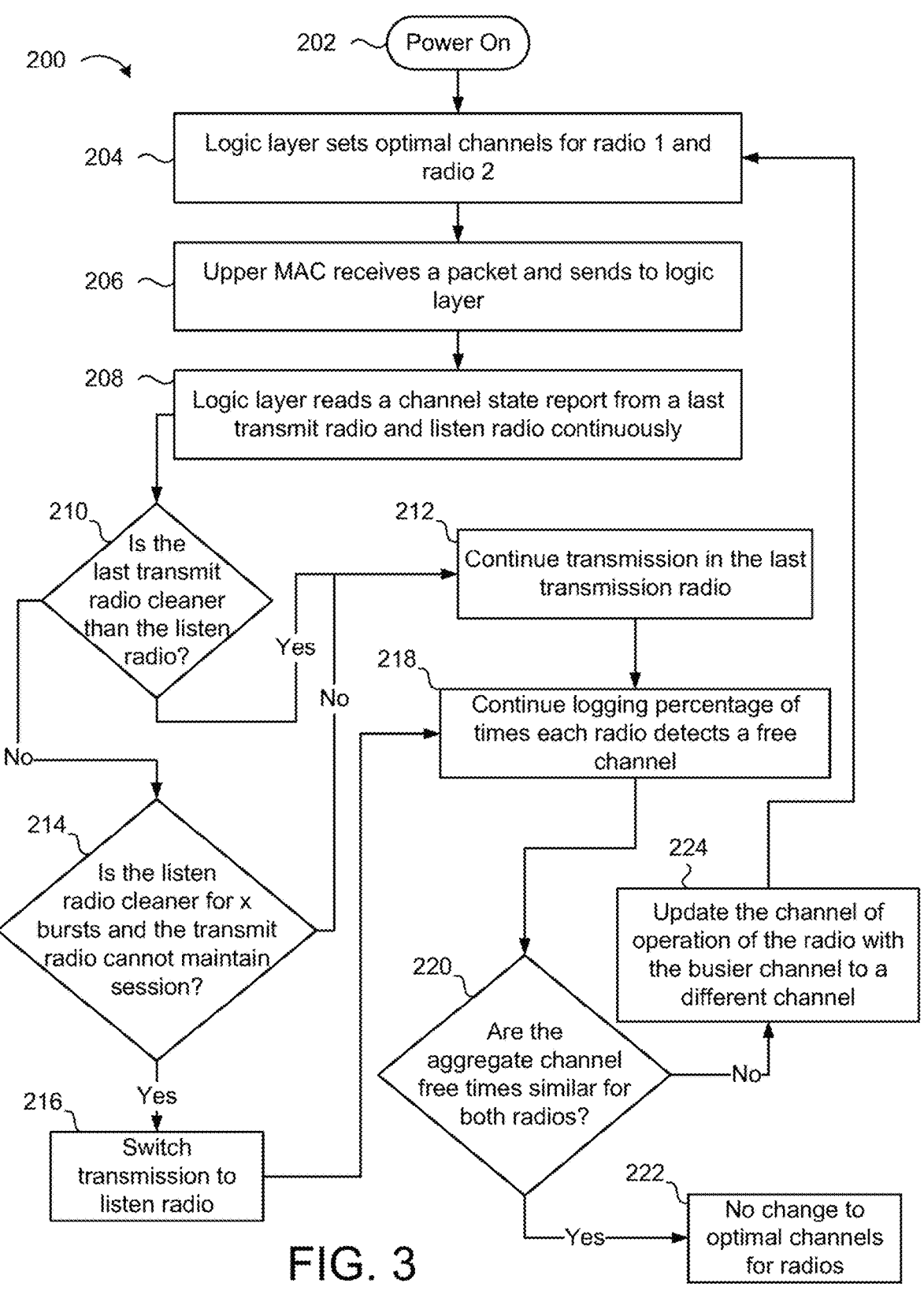
FIG. 3 is an exemplary method for implementing the system for Wi-Fi channel optimization of FIG. 1.

Referring to FIG. 3, a method 200 for optimizing the WLAN channels of the Wi-Fi system 100 is generally shown. At step 202, the Wi-Fi system 100 is powered on, e.g., the vehicle 102 is started. At step 204, the logic layer

124 of the telematics system 104 sets optimal channels for the first transmission radios 130, 142 and the second listen radios 132, 144. At step 206, the upper MAC 122 of the telematics system 104 receives a packet from the STA 106 and sends the packet to the logic layer 124. At step 208, the logic layer 124 reads a channel state report from the last or most recent first transmission radios 130, 142 and the second listen radios 132, 144 continuously. The channel state report may include data related to many characteristics of the radios and the channels. For example, the channel state report may include cleanliness data indicating a cleanliness of the first transmission radios 130, 142 and a cleanliness of the second listen radios 132, 144. The channel state report may include free channel data indicating a percentage of times each of the first transmission radios 130, 142 and the second listen radios 132, 144 detect a free channel.

At step 210, the logic layer 124 determines whether the last or most recent first transmission radios 130, 142 are cleaner than the second listen radios 132, 144. If, at step 210, the logic layer 124 determines that the last or most recent first transmission radios 130, 142 are cleaner than the second listen radios 132, 144, then, at step 212, the logic layer 124 continues transmission in the last or most recent first transmission radios 130, 142, and, at step 218, the logic layer 124 continues logging a percentage of times each radio 130, 142, 132, 144 detects a free channel. If, at step 210, the logic layer 124 determines that the last or most recent first transmission radios 130, 142 are not cleaner than the second listen radios 132, 144, then, at step 214, the logic layer 124 determines whether the second listen radios 132, 144 are cleaner for x bursts (where x is a pre-defined number of bursts, e.g., 10, 15, 20, etc.) and the first transmission radios 130, 142 cannot maintain the session. If, at step 214, the logic layer 124 determines that the second listen radios 132, 144 are cleaner for x bursts and the first transmission radios 130, 142 cannot maintain the session, then, at step 216, the logic layer 124 switches transmission to the second listen radios 132, 144. If, at step 214, the logic layer 124 determines that the second listen radios 132, 144 are not cleaner for x bursts and the first transmission radios 130, 142 can maintain the session, then, at step 218, the logic layer 124 continues logging a percentage of times each radio 130, 142, 132, 144 detects a free channel.

At step 220, the logic layer 124 determines whether the aggregate channel free times are similar for both radios 130, 142, 132, 144. If, at step 220, the logic layer 124 determines that the aggregate channel free times are similar for both radios 130, 142, 132, 144, then, at step 222, the logic layer 124 makes no change to the optimal channels for the 130, 142, 132, 144. If, at step 220, the logic layer 124 determines that the aggregate channel free times are dissimilar for both radios 130, 142, 132, 144, then, at step 224, the logic layer 124 updates the channel of operation of the radio with the busier channel to a different channel and returns to step 204. That is, the logic layer 124 optimizes the channel by moving the connection to a less busy and more similar channel based on the foregoing operations that monitor these characteristics.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for a vehicle comprising:
a Wi-Fi station;
data processing hardware; and
memory hardware in communication with the data processing hardware, the memory hardware storing instructions that when executed on the data processing hardware cause the data processing hardware to perform operations comprising:
setting an initial transmission channel for a transmission radio;
setting an initial listen channel for a listen radio;
obtaining a channel state report based on data related to the transmission radio and the listen radio;
determining cleanliness data based on the channel state report indicating a cleanliness of the transmission radio and a cleanliness of the listen radio;
if the cleanliness data indicates the transmission radio is cleaner than the listen radio, maintaining the initial transmission channel and the initial listen channel; and
if the cleanliness data indicates the listen radio is cleaner than the transmission radio, switching transmission from the transmission radio to the listen radio.

2. The system of claim 1, wherein the operations further comprise obtaining free channel data indicating a percentage of times each of the transmission radio and the listen radio detect a free channel.

3. The system of claim 2, wherein the operations further comprise determining whether aggregate channel free times are similar between the transmission radio and the listen radio based on the free channel data.

4. The system of claim 3, wherein the operations further comprise if the aggregate channel free times are similar between the transmission radio and the listen radio, maintaining the initial transmission channel and the initial listen channel.

5. The system of claim 3, wherein the operations further comprise if the aggregate channel free times are dissimilar between the transmission radio and the listen radio, changing the initial transmission channel to a different channel.

6. The system of claim 5, wherein the operations further comprise if the aggregate channel free times are dissimilar between the transmission radio and the listen radio, changing the initial radio channel to a different channel.

7. The system of claim 1, wherein the Wi-Fi station uses Wi-Fi 7.

8. A computer-implemented method when executed on data processing hardware causes the data processing hardware to perform operations comprising:
setting an initial transmission channel for a transmission radio between a station and an access point;
setting an initial listen channel for a listen radio between the station and the access point;
obtaining a channel state report based on data related to the transmission radio and the listen radio;
determining cleanliness data and free channel data based on the channel state report;

if the cleanliness data indicates the transmission radio is cleaner than the listen radio, maintaining the initial transmission channel and the initial listen channel;
if the cleanliness data indicates the listen radio is cleaner than the transmission radio, switching transmission from the transmission radio to the listen radio;
if the free channel data indicates aggregate channel free times are similar between the transmission radio and the listen radio, maintaining the initial transmission channel and the initial listen channel; and
if the free channel data indicates the aggregate channel free times are dissimilar between the transmission radio and the listen radio, changing the initial transmission channel to a different channel.

9. The method of claim 8, wherein the cleanliness data indicates a cleanliness of the transmission radio and a cleanliness of the listen radio.

10. The method of claim 8, wherein the free channel data indicates a percentage of times each of the transmission radio and the listen radio detect a free channel.

11. The method of claim 8, further comprising if the aggregate channel free times are dissimilar between the transmission radio and the listen radio, changing the initial radio channel to a different channel.

12. The method of claim 8, wherein the station is one of a smartphone, a tablet, or a laptop computer.

13. The method of claim 8, wherein the access point is in a vehicle.

14. The method of claim 8, wherein the method is implemented using Wi-Fi 7.

15. A computer-implemented method when executed on data processing hardware causes the data processing hardware to perform operations comprising:
setting an initial transmission channel for a transmission radio between a station and an access point;
setting an initial listen channel for a listen radio between the station and the access point;
obtaining cleanliness data and free channel data;
performing one of maintaining the initial transmission channel and the initial listen channel or switching transmission from the transmission radio to the listen radio based on the cleanliness data; and
performing one of maintaining the initial transmission channel and the initial listen channel or changing the initial transmission channel to a different channel based on the free channel data.

16. The method of claim 15, wherein the operations comprise maintaining the initial transmission channel and the initial listen channel when the cleanliness data indicates the transmission radio is cleaner than the listen radio and when the free channel data indicates aggregate channel free times are similar between the transmission radio and the listen radio.

17. The method of claim 15, wherein the operations comprise switching transmission from the transmission radio to the listen radio when the cleanliness data indicates the listen radio is cleaner than the transmission radio.

18. The method of claim 15, wherein the operations comprise changing the initial transmission channel to a different channel when the free channel data indicates aggregate channel free times are dissimilar between the transmission radio and the listen radio.

19. The method of claim 15, wherein the station is one of a smartphone, a tablet, or a laptop computer and the access point is in a vehicle.

20. The method of claim 15, wherein the method is implemented using Wi-Fi 7.

* * * * *